US011236885B1

United States Patent
Morgenstein et al.

(10) Patent No.: US 11,236,885 B1
(45) Date of Patent: Feb. 1, 2022

(54) SWITCHABLE FLOOD AND SPOT ILLUMINATOR

(71) Applicant: Apple Inc., Cupertino, CA (US)

(72) Inventors: Boris Morgenstein, Tel Aviv (IL); Ali M. Khan, San Jose, CA (US); Andrew T. Herrington, San Francisco, CA (US); Assaf Avraham, Givatayim (IL); Gregory A. Cohoon, Sunnyvale, CA (US); Refael Della Pergola, Jerusalem (IL); Yuval Tsur, Tel Aviv (IL)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/876,136

(22) Filed: May 18, 2020

Related U.S. Application Data (60) Provisional application No. 62/869,579, filed on Jul. 2, 2019.

(51) Int. Cl.
| | | |
|---|---|---|
| *G02F 1/01* | (2006.01) | |
| *F21V 5/00* | (2018.01) | |
| *G02F 1/00* | (2006.01) | |
| *G02F 1/03* | (2006.01) | |

(52) U.S. Cl.
CPC .............. *F21V 5/004* (2013.01); *F21V 5/003* (2013.01); *F21V 5/007* (2013.01); *G02F 1/0018* (2013.01); *G02F 1/0105* (2013.01); *G02F 1/0316* (2013.01)

(58) Field of Classification Search
CPC .......... F21V 5/003; F21V 5/004; F21V 5/007; G02F 1/0018; G02F 1/0105; G02F 1/0316; G09G 3/36; G09G 2300/0426
See application file for complete search history.

(56) References Cited

U.S. PATENT DOCUMENTS

| | | | | |
|---|---|---|---|---|
| 4,606,612 A | * | 8/1986 | Iizuka | G02B 13/20 349/139 |
| 5,504,597 A | * | 4/1996 | Sprague | G02B 3/0056 349/112 |
| 7,079,203 B1 | * | 7/2006 | Huang | G02F 1/1334 349/95 |

(Continued)

FOREIGN PATENT DOCUMENTS

| | | | | |
|---|---|---|---|---|
| JP | WO 9315433 | * | 8/1993 | ............... F21V 11/00 |

OTHER PUBLICATIONS

English Machine Translation of WO 9315433 provided by ESPACENET (Year: 1993).*

(Continued)

*Primary Examiner* — Zheng Song
(74) *Attorney, Agent, or Firm* — Kligler & Associates Patent Attorneys Ltd (57) ABSTRACT

An optical apparatus includes a transparent envelope having opposing first and second faces. An electro-optic material is contained within the transparent envelope and includes molecules oriented in respective predefined directions selected so as to form a geometric-phase structure across an area of the transparent envelope. First and second transparent electrodes are disposed respectively across the first and second faces of the transparent envelope. A controller is coupled to apply a voltage between the first and second transparent electrodes that is sufficient to displace the molecules of the electro-optic material from the predefined directions.

16 Claims, 5 Drawing Sheets

(56) References Cited

U.S. PATENT DOCUMENTS

| | | | | |
|---|---|---|---|---|
| 8,860,897 B1* | 10/2014 | Anderson | ............ | G02F 1/1326 |
| | | | | 349/17 |
| 2004/0017523 A1* | 1/2004 | Asada | ................ | G02F 1/13718 |
| | | | | 349/86 |
| 2006/0227283 A1* | 10/2006 | Ooi | .................... | G02F 1/13718 |
| | | | | 349/201 |
| 2016/0011353 A1* | 1/2016 | Escuti | .................. | G02B 5/3083 |
| | | | | 359/15 |
| 2019/0011801 A1* | 1/2019 | Komanduri | ....... | G02F 1/134309 |
| 2019/0186712 A1* | 6/2019 | Galstian | .............. | G02F 1/13439 |
| 2021/0112647 A1* | 4/2021 | Coleman | ................ | F21V 14/02 |

OTHER PUBLICATIONS

Escuti et al., "Geometric-Phase Lenses", Optics & Photonics News, pp. 22-29, Feb. 2016.

Kim et al., "Fabrication of ideal geometric-phase holograms with arbitrary wavefronts", Optica, vol. 2, No. 11, pp. 958-964, Nov. 2015.

Miskiewicz et al., "Progress on large-area polarization grating fabrication", Proceedings of SPIE Defense, Security, and Sensing Conference, vol. 8395, p. 83950G1-7, Baltimore, USA, Apr. 23-27, 2012.

Escuti et al., "Simplified Spectropolarimetry Using Reactive Mesogen Polarization Gratings", Proceedings of SPIE Optics & Photonics Conference, vol. 6302, p. 630207-1 through 630207-11, San Diego, USA, Aug. 13-17, 2006.

\* cited by examiner

SWITCHABLE FLOOD AND SPOT ILLUMINATOR

CROSS-REFERENCE TO RELATED APPLICATION

This application claims the benefit of U.S. Provisional Patent Application 62/869,579, filed Jul. 2, 2019, which is incorporated herein by reference.

FIELD OF THE INVENTION

The present invention relates generally to optoelectronic devices, and particularly to illuminators.

BACKGROUND

Some applications of handheld electronic devices, such as depth-mapping and recognition of a scene, require the device to illuminate a scene. However, these two applications require different modalities of illumination: Depth-mapping is commonly performed using structured light, for example by projecting multiple discrete spots of radiation onto the scene. Scene recognition, on the other hand, typically requires high spatial resolution, which favors spatially continuous illumination, also referred to as flood illumination.

SUMMARY

Embodiments of the present invention that are described herein provide improved optical components, as well as apparatus and methods for illumination using such components.

There is therefore provided, in accordance with an embodiment of the invention, an optical apparatus, including a transparent envelope having opposing first and second faces and an electro-optic material contained within the transparent envelope and including molecules oriented in respective predefined directions selected so as to form a geometric-phase structure across an area of the transparent envelope. First and second transparent electrodes are disposed respectively across the first and second faces of the transparent envelope. A controller is coupled to apply a voltage between the first and second transparent electrodes that is sufficient to displace the molecules of the electro-optic material from the predefined directions.

In a disclosed embodiment, the predefined directions of the molecules of the electro-optic material are oriented in a plane parallel to the faces of the transparent envelope, and application of the voltage causes the molecules to rotate out of the plane.

In some embodiments, the geometric-phase structure includes one or more geometric-phase lenses. In a disclosed embodiment, the geometric-phase lenses include multiple geometric-phase lenslets having respective optical centers, and the transparent envelope includes, on an inner surface of the envelope, a photo-alignment layer, which causes the directions of the molecules of the electro-optical material to align in concentric rings around the optical centers. Typically, respective optical centers of the lenslets are arranged in an array across the area of the transparent envelope. In one embodiment, the optical centers are distributed non-uniformly across the area of the transparent envelope. Additionally or alternatively, the lenslets have equal f-numbers (f/#).

In some embodiments, the geometric-phase structure causes incident optical radiation of a first circular polarization to converge and causes the incident optical radiation of a second circular polarization, opposite the first circular polarization, to diverge. Typically, application of the voltage in excess of a given threshold causes the incident optical radiation to be transmitted without convergence or divergence.

In another embodiment, the geometric-phase structure includes a computer-generated hologram (CGH).

In a disclosed embodiment, the electro-optic material includes nematic liquid crystal material.

In some embodiments, the apparatus includes a radiation source which is configured to project patterned radiation onto the envelope, wherein when the voltage is applied, the pattern is transmitted through the electro-optic material, and when the voltage is interrupted, the geometric-phase structure homogenizes the pattern. In a disclosed embodiment, the radiation source includes an array of vertical-cavity surface-emitting lasers (VCSELs).

There is also provided, in accordance with an embodiment of the invention, a method for illumination, which includes providing a transparent envelope having opposing first and second faces and containing an electro-optic material including molecules oriented in respective predefined directions selected so as to form a geometric-phase structure across an area of the transparent envelope. First and second transparent electrodes are disposed respectively across the first and second faces of the transparent envelope. A voltage is switchably applied between the first and second transparent electrodes that is sufficient to displace the molecules of the electro-optic material from the predefined directions.

The present invention will be more fully understood from the following detailed description of the embodiments thereof, taken together with the drawings in which:

DETAILED DESCRIPTION OF EMBODIMENTS

Overview

Electronic devices that are required to provide both structured illumination and broad floodlighting commonly include two separate illuminators for these purposes. In contrast to these conventional approaches, the embodiments of the present invention that are described herein address this need by means of a single, highly efficient illuminator, which comprises an electro-optic modulator capable of switching between these two modalities of illumination, using the same radiation source.

In the disclosed embodiments, a radiation source, such as an array of vertical-cavity surface-emitting lasers (VC-SELs), projects multiple beams of radiation onto an entrance face of the planar transparent envelope of the electro-optic modulator. The envelope contains a layer of electro-optic material, such as a liquid crystal, between two transparent electrodes disposed over the opposing faces of the envelope. (The terms "optical radiation," "radiation," and "light" as used in the context of present description and in the claims refer generally to any and all of visible, infrared, and ultraviolet radiation. The term "transparent" as used in this context refers generally to an object that transmits at least 90% of the incident light. The term "envelope" in this context means a solid structure that contains the liquid crystal material.)

The molecules of the electro-optic material are arranged in the envelope in a certain rest configuration, and change their orientation in response to an electric field applied between the transparent electrodes. In the rest configuration, the electro-optical material forms an optical phase structure based on geometric phase, termed a "geometric-phase structure." For this purpose, the molecules are oriented in planes parallel to the faces of the envelope, with their local orientations in the plane configured to apply local geometric phase shifts to the incident radiation and thus yield the desired geometric-phase effect. This structure homogenizes the radiation projected by the radiation source, thus producing uniform flood illumination.

Applying a voltage exceeding a certain threshold voltage between the two electrodes causes the molecules of the electro-optic material to rotate towards an orientation perpendicular to the two faces of the envelope. This rotation out of the rest configuration effectively erases the geometric-phase structure. Consequently, the beams of radiation from the radiation source are transmitted through the envelope substantially without a change in their respective directions or angles of divergence, thus illuminating the scene with patterned radiation, such as a pattern of discrete spots corresponding to the beam projected by the radiation source. When the voltage is switched off, the electro-optic material returns to its rest configuration, thus restoring the geometric-phase structure in order to produce flood illumination.

As noted above, the electro-optic modulator in the rest configuration operates by applying local geometric phase shifts to the incident radiation. In general, a geometric phase shift occurs when a light wave is transformed through one parameter space, e.g., polarization, in such a way as to create a change in a second parameter, e.g., phase. In the electro-optic material of the disclosed embodiments, the geometric phase is proportional to the relative angle between the orientation of the molecules of the electro-optic material and the polarization of the incident radiation. Therefore, the geometric phase structure of the electro-optic material in embodiments of the present invention causes different polarization states of the incident light to undergo different phase shifts in passing through the electro-optic material. Specifically, in the disclosed embodiments, when the incident light comprises a mixture of different polarizations, the different phase shifts in the electro-optic material result in diffusion of the light.

Further details of the physical principles and methods of fabrication of geometrical phase modulators are presented, for example, by Escuti et al., in "Geometric-Phase Lenses," published in *Optics & Photonics News*, February 2016, pp. 22-29, and by Kim et al., in "Fabrication of ideal geometric-phase holograms with arbitrary wavefronts," published in *Optica*, vol. 2, number 11, November 2015, pp. 958-964. These publications are incorporated herein by reference.

A geometric-phase structure producing flood illumination may comprise, for example, a computer generated hologram (CGH), small lenses (termed "lenslets") distributed either uniformly or non-uniformly and with uniform or non-uniform diameters, or a single lens. A CGH of this sort may be designed, for example, using a design algorithm known as the Gershberg-Saxton algorithm.

Although all of the above mentioned methods provide flood illumination, a geometric-phase structure comprising non-uniformly distributed geometric-phase lenslets yields enhanced performance in terms of uniform homogenization of the incident optical radiation, and this embodiment will be further detailed below.

Each geometric-phase lenslet illuminated by a beam, as will be further detailed below, converts respective parts of the beam into a diverging and/or converging wavefront of orthogonal polarizations. Due to the diverging and/or converging wavefronts, non-uniformly distributed over the area of the electro-optic modulator, the discrete structure of the input beams is obliterated. As a result, the radiation exiting through the exit face of the electro-optic modulator is homogenized in the far-field, i.e., at a distance from the electro-optic modulator that is several times a typical focal length of a lenslet. This radiation is projected onto a scene, which is now illuminated uniformly. Although the lenslets are non-uniformly distributed, and may also have varying focal lengths, it is desirable that their optical f-numbers (f/#) be equal for uniform illumination. (f/# is defined in optics as the ratio between the focal length of a lens and the diameter of the lens.)

Conversion of the incident light into the converging and/or diverging wavefronts may take place at very high conversion efficiencies, exceeding 90%. The conversion efficiency will be limited by absorption in the electro-optic material, the electrodes, and any other layers within the envelope, manufacturing defects, and misalignment of the photo-alignment layers. As the electro-optic modulator ideally functions as a half-wave plate, any deviation from the half-wave condition will significantly lower the conversion efficiency. Transmission of the patterned radiation when the voltage is applied to the electro-optic modulator is likewise highly efficient.

System Description

Figure 1:
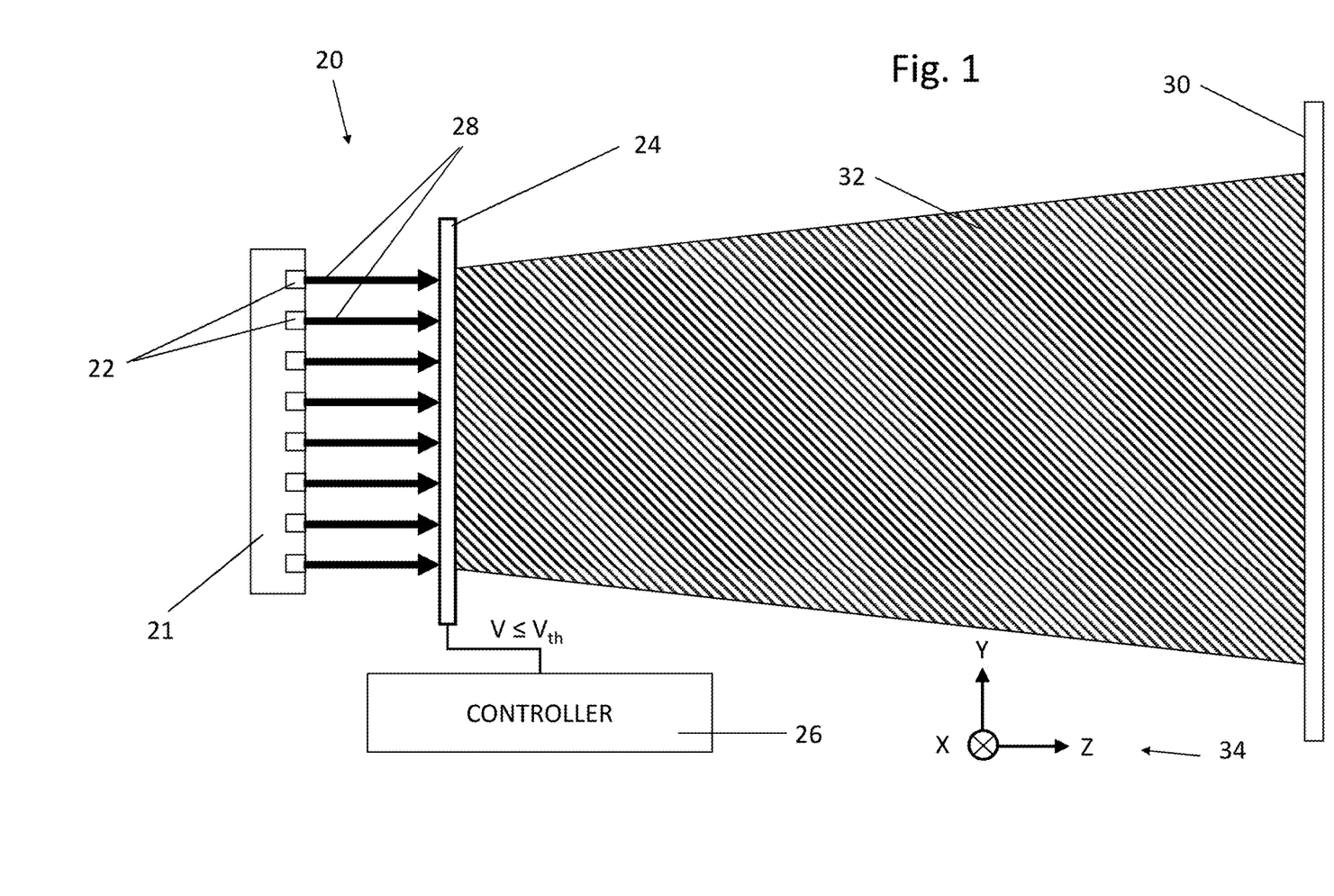
FIGS. 1 and 2 are schematic sectional views of an illuminator configured for two different illumination modalities, in accordance with an embodiment of the invention.
Figure 2:
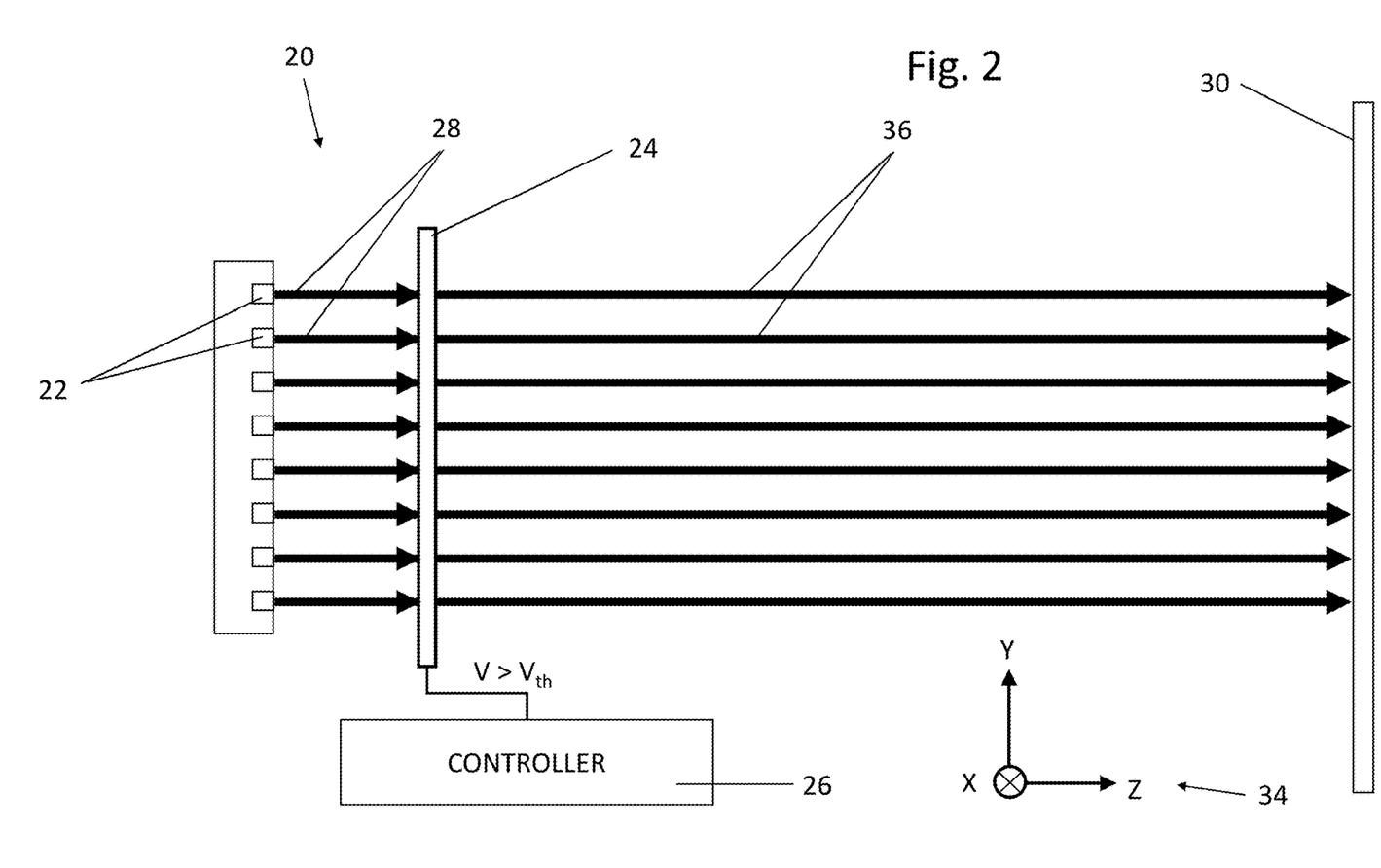

FIGS. 1 and 2 are schematic sectional views of an illuminator 20 configured for two different illumination modalities, in accordance with an embodiment of the invention.

Illuminator 20 comprises a radiation source comprising an array 21 of emitters 22, an electro-optic modulator 24, and a controller 26 coupled to the electro-optic modulator. Details of electro-optic modulator 24 are described below. Emitters 22 emit beams of radiation 28 toward modulator 24. In one embodiment, emitters 22 comprise solid-state devices, such as vertical-cavity surface-emitting lasers (VC-SELs), together with suitable optics (not shown), which emit respective beams 28, thus generating a pattern of light corresponding to the pattern of emitters 22 in array 21. Alternatively or additionally, illuminator 20 may comprise one or more emitters and a patterning element, such as a diffractive optical element (DOE) or other transparency, which generates a pattern of spots or other structured light pattern. Emitters 22 may emit either polarized or unpolarized (or partially polarized) light, as electro-optical modulator 24 will impose a phase modulation on each polarization component separately.

Referring to a Cartesian coordinate system 34, array and modulator 24 are oriented in XY-planes (planes perpendicular to the Z-axis, with different Z-coordinates), and beams 28 propagate in the Z-direction. In alternative embodiments array 21 and modulator 24 may be non-parallel with respect to each other. Cartesian coordinate system 34 is defined for the convenience of description only, and other coordinate systems may be defined as well.

As illustrated in FIG. 1, when no voltage (or a voltage not exceeding a certain threshold voltage $V_{th}$) is applied by controller 26 to modulator 24, the modulator is said to be in an "off-state," and beams 28 are homogenized by modulator 24 to illuminate a scene 30 with uniform illumination 32 propagating primarily in the Z-direction. The illumination is uniform in the sense that the pattern of beams 28 generated by illuminator 20 is obliterated. The uniform illumination on scene 30 may also be termed "flood illumination."

When, as illustrated in FIG. 2, a voltage exceeding the threshold voltage $V_{th}$ is applied by controller 26 to modulator 24, the modulator is said to be in an "on-state." In this case, beams 28 are not homogenized by the modulator, but rather propagate to scene 30 as discrete beams 36. Thus, in the "on-state" scene 30 is illuminated by structured illumination. In this example, the structured illumination comprises a pattern of discrete spots of light, but modulator 24 will operate similarly on other sorts of light patterns, as noted above.

Thus, controller 26 is able to switch the illumination of scene 30 between the two modalities of flood illumination and structured illumination simply by applying suitable control voltages to modulator 24.

In some embodiments, controller 26 comprises a programmable controller, which is programmed in software and/or firmware to carry out the functions that are described herein and may also carry out other processing functions, such as processing images of scene 30 in a device in which illuminator 20 is installed. Additionally or alternatively, controller 26 may simply comprise suitable hardware logic circuits, which may be hard-wired or programmable. In either case, controller 26 comprises a suitable voltage source and interface for driving illuminator 20 and switching the state of modulator 24 as described.

Modulator Design and Operation

Figure 3:
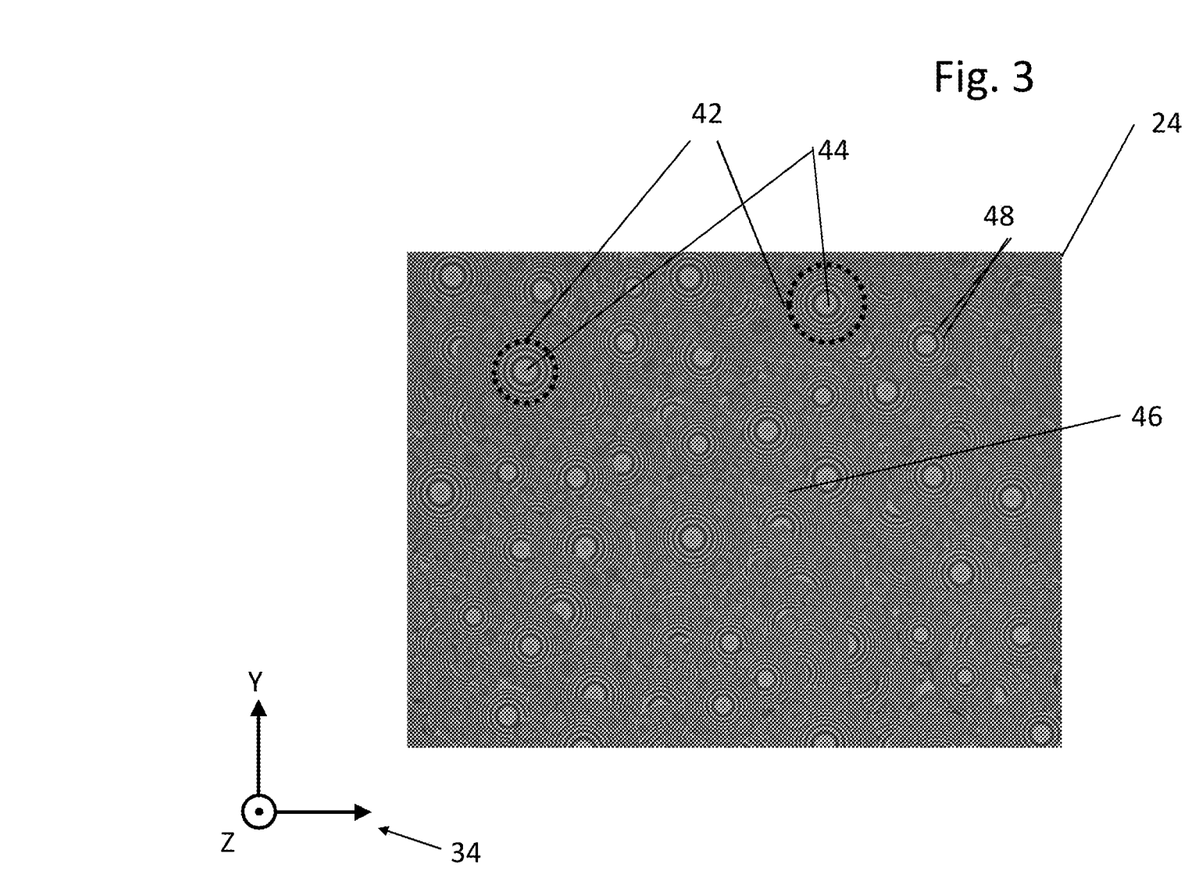
FIG. 3 is a schematic frontal view of an electro-optic modulator in an "off-state", in accordance with an embodiment of the invention.

FIG. 3 is a schematic frontal view of electro-optic modulator 24 in the "off-state", in accordance with an embodiment of the invention. In this state, modulator 24 defines multiple geometric-phase lenslets 42 with respective optical centers 44 distributed in a non-uniform pattern across an active area 46 of the modulator. Lenslets 42 are visualized by circular rings 48 that represent the equiphase contours of phase modulation imposed by the lenslets onto transmitted light. (The equiphase contours could be generated by, for example, inserting electro-optic modulator 24 between two crossed linear polarizers, as is known to those skilled in the art.) In the present example, lenslets 42 have a typical diameter of 100 microns, but larger or smaller lenslets may alternatively be produced. Due to the non-uniform pattern of lenslets 42, they overlap each other, thus breaking the circular shapes.

Although lenslets 42 are non-uniformly distributed, and may also have varying focal lengths, it is desirable that their optical f-numbers (f/#) be equal for uniform illumination. As the circular shapes of lenslets 42 may be broken by neighboring, overlapping lenslets, the lenslet diameter for the f/#of each lenslet is taken as defined by the unbroken part of the lenslet circumference.

Figure 4:
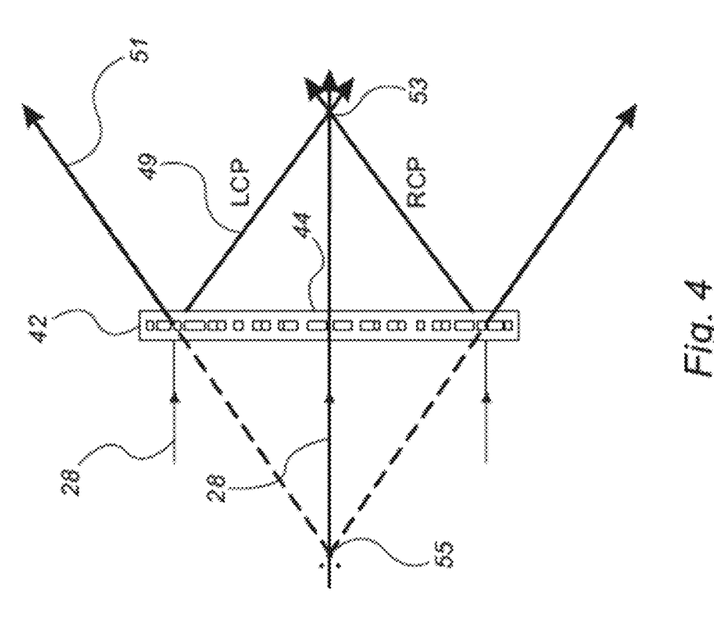
FIG. 4 is a schematic sectional view of a geometric-phase lenslet, showing its focusing effect on a beam, in accordance with an embodiment of the invention.

FIG. 4 is a schematic sectional view of one geometric-phase lenslet 42 and its focusing effect on one of beams 28, in accordance with an embodiment of the invention. This figure shows a small part of modulator 24 in a magnified view in the Y-Z plane. The width of beam 28 relative to lenslet 42 is represented by the multiple parallel arrows coming from the left side of the figure.

Beam 28 is assumed to comprise both right-hand circularly polarized (RCP) light and left-hand circularly polarized (LCP) light. When beam 28 impinges on lenslet 42, it is transmitted by the lenslet and split into two beams 49 and 51, corresponding to the RCP and LCP components of beam 28, respectively. For the RCP-component of beam 28, lenslet 42 acts as a positive lens, focusing that component of the beam into beam 49 towards a focal point 53 close to the lenslet, and simultaneously converting it into LCP light. For the LCP-component of beam 28, lenslet 42 acts as a negative lens, converting that component of the beam into beam 51 comprising RCP light, and diverging from a virtual focal point 55. As beam 49 also diverges after passing its focal point 53, each lenslet 42 converts beam 28 into two oppositely circularly polarized diverging beams. This effect, together with the non-uniform distribution of the lenslets, homogenizes the array of beams 28 and generates uniform illumination on scene 30.

Figure 5A:
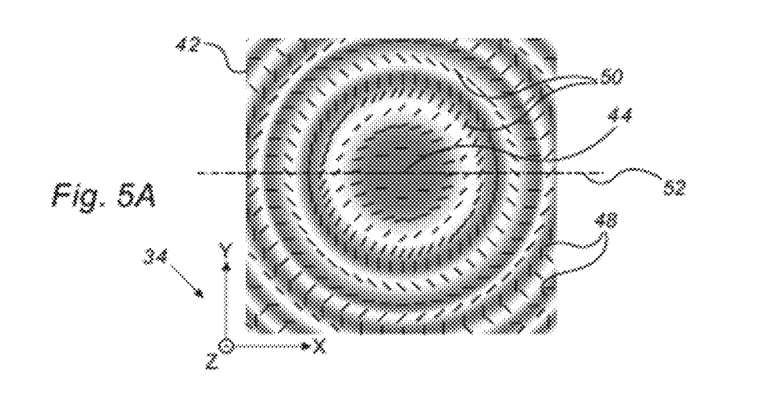
FIG. 5A is a schematic frontal view of a single lenslet within an electro-optic modulator, in accordance with an embodiment of the invention.
Figure 5B:
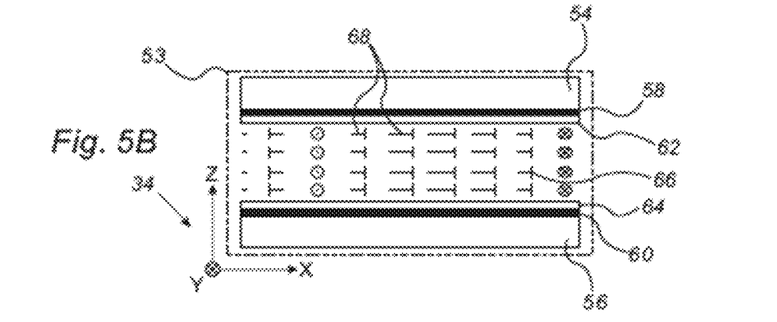
FIGS. 5B and 5C are schematic sectional view of the lenslet of FIG. 5A in an "off-state" and "on-state," respectively.
Figure 5C:
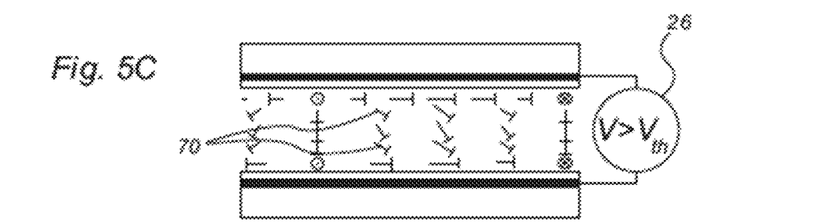

FIGS. 5A-C are schematic frontal and sectional views of a single lenslet 42 within electro-optic modulator 24, in accordance with an embodiment of the invention. FIGS. 5A and 5B show the modulator is in the "off-state," in which lenslet 42 is operational, whereas FIG. 5C shows the modulator in the "on-state." The sectional views shown in FIGS. 5B and 5C are taken along a line 52 in FIG. 5A.

As illustrated in FIG. 5B, modulator 24 comprises a transparent envelope 53, made up of a first substrate 54 and a second substrate 56. The envelope contains a suitable electro-optic material, such as a layer of a nematic liquid crystal 66, typically a few microns thick, for example 2.5 microns. The exact thickness is determined by the requirement that modulator 24 should function as a half-wave plate. For example, at a wavelength of 940 nm and for a material with a birefringence of 0.2, the required thickness is 2.5 microns. The required thickness will vary according to variations of wavelength and/or material properties. Substrates 54 and 56 are fabricated of glass or other suitable transparent material and define the opposing faces of envelope 53. First and a second transparent electrodes 58 and 60 are coated over substrates 54 and 56, respectively, so that the electrodes are facing each other. A typical material for electrodes 58 and 60 is indium-tin-oxide (ITO), but other suitable electrode materials may alternatively be used.

First and second photo-alignment layers 62 and 64 are coated over first and second electrodes 58 and 60, respectively. Photo-alignment layers commonly comprise a patterned film of a suitable polymer, such as an azo dye. The photo-alignment layers are patterned, for example by a holographic technique or by direct laser writing, as described in the above-referenced article by Kim et al., in order to create a pattern of directors 50. These directors 52 control the local orientations of the molecules of liquid crystal 66 in the "off-state" of lenslet 42. It is this pattern, imposed by photo-alignment layers 62 and 64, that forms geometric-phase lenslets 42 in modulator 24.

In the frontal view of FIG. 5A, equiphase contours of lenslet 42 are represented by circular rings 48 as in FIG. 3, and directors 50 of the liquid-crystal molecules are represented schematically by short lines. Each director 50 represents the direction of the long axis of a nematic liquid-crystal molecule, with all directors having the same length (not related to the actual length of the molecule). The density of directors 50 in FIG. 5A is much lower than the actual density of the liquid-crystal molecules, and is chosen for visualization purposes only.

In the "off-state" shown in FIGS. 5A and 5B, all liquid-crystal molecules are parallel to the XY-plane, and the geometric phase imposed by modulator 24 in a given location in the XY-plane is proportional to the rotational angle of director 50 at that location around the Z-axis. Consequently, directors 50 within any circle around optical center 44 of lenslet 42 have the same angular orientation in the XY-plane. As there is no voltage (or a voltage not exceeding the predetermined threshold voltage $V_{th}$) applied to electrodes 58 and 60, directors 50 are oriented parallel to the XY-plane, as illustrated, as well, by projections 68 of the directors in the XZ-plane that are shown in FIG. 5B.

Due to the symmetry of electro-optic modulator 24 with respect to the layer of liquid crystal 66, either of the outward-looking faces of substrates 54 and 56 may serve as the entrance face of the modulator, while the opposing face serves as the exit face. The conversion of the incident light by modulator 24 into the converging and diverging beams, as shown in FIG. 4, can take place at very high conversion efficiencies, exceeding 90%. The conversion efficiency may be limited by absorption and reflection by liquid crystal 66, electrodes 58 and 60, and substrates 54. It may further be limited by both absorption and misalignment of photo-alignment layers 62 and 64, as well as by any deviation from the half-wave condition.

In FIG. 5C, a voltage V exceeding a certain threshold voltage $V_{th}$, for example 20 V, has been applied between first and second electrodes 58 and 60 by controller 26. The threshold voltage is sufficient to cause the molecules of liquid crystal 66 to rotate out of the XY-plane, as shown by rotated directors 70, thus erasing the geometric phase distribution that existed in the "off-state." Consequently, modulator 24 does not impose any lateral phase modulation on beams 28 in the "on-state" (as illustrated in FIG. 2), and the beams are transmitted by the modulator without any significant change in their direction or divergence into beams 36. Again, transmissivity from beams 28 to beams 36 may be limited due to the reasons enumerated in the previous paragraph.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical apparatus, comprising:
    a transparent envelope having opposing first and second faces;
    an electro-optic material contained within the transparent envelope and comprising molecules oriented in respective predefined directions selected so as to form a geometric-phase structure comprising multiple geometric-phase lenslets, having respective optical centers, across an area of the transparent envelope,
    wherein the transparent envelope comprises, on an inner surface of the envelope, a photo-alignment layer, which causes the directions of the molecules of the electro-optical material to align in concentric rings around the optical centers;
    first and second transparent electrodes disposed respectively across the first and second faces of the transparent envelope; and
    a controller coupled to apply a voltage between the first and second transparent electrodes that is sufficient to displace the molecules of the electro-optic material from the predefined directions.

2. The optical apparatus according to claim 1, wherein respective optical centers of the lenslets are arranged in an array across the area of the transparent envelope.

3. The optical apparatus according to claim 2, wherein the optical centers are distributed non-uniformly across the area of the transparent envelope.

4. The optical apparatus according to claim 2, wherein the lenslets have equal f-numbers (f/#).

5. The optical apparatus according to claim 1, wherein the geometric-phase structure causes incident optical radiation of a first circular polarization to converge and causes the incident optical radiation of a second circular polarization, opposite the first circular polarization, to diverge.

6. The optical apparatus according to claim 5, wherein application of the voltage in excess of a given threshold causes the incident optical radiation to be transmitted without convergence or divergence.

7. The optical apparatus according to claim 1, and comprising:
    a radiation source which is configured to project patterned radiation through the first face of the envelope, wherein when the voltage is applied, the pattern is transmitted through the electro-optic material and exits through the second face, and when the voltage is interrupted, the geometric-phase structure homogenizes the pattern.

8. The optical apparatus according to claim 7, wherein the radiation source comprises an array of vertical-cavity surface-emitting lasers (VCSELs).

9. The optical apparatus according to claim 1, wherein the predefined directions of the molecules of the electro-optic material are oriented in a plane parallel to the faces of the transparent envelope, and application of the voltage causes the molecules to rotate out of the plane.

10. The optical apparatus according to claim 1, wherein the geometric-phase structure comprises a computer-generated hologram (CGH).

11. The optical apparatus according to claim 1, wherein the electro-optic material comprises nematic liquid crystal material.

12. A method for illumination, comprising:
    providing a transparent envelope having opposing first and second faces and containing an electro-optic material comprising molecules oriented in respective predefined directions selected so as to form a geometric-phase structure comprising multiple geometric-phase lenslets, having respective optical centers, across an area of the transparent envelope,
    wherein the transparent envelope comprises, on an inner surface of the envelope, a photo-alignment layer, which causes the directions of the molecules of the electro-optical material to align in concentric rings around the optical centers;

disposing first and second transparent electrodes respectively across the first and second faces of the transparent envelope; and switchably applying a voltage between the first and second transparent electrodes that is sufficient to displace the molecules of the electro-optic material from the predefined directions.

13. The method according to claim 12, and comprising projecting patterned radiation onto the envelope, wherein when the voltage is applied, the pattern is transmitted through the electro-optic material, and when the voltage is interrupted, the geometric-phase structure homogenizes the pattern.

14. The method according to claim 12, wherein the geometric-phase structure causes incident optical radiation of a first circular polarization to converge and causes the incident optical radiation of a second circular polarization, opposite the first circular polarization, to diverge.

15. The method according to claim 12, wherein the predefined directions of the molecules of the electro-optic material are oriented in a plane parallel to the faces of the transparent envelope, and application of the voltage causes the molecules to rotate out of the plane.

16. The method according to claim 12, wherein the geometric-phase structure comprises a computer-generated hologram (CGH).

\* \* \* \* \*